United States Patent [19]
Rion

[11] 3,912,523
[45] Oct. 14, 1975

[54] HEAT RESISTANT PORCELAIN ENAMEL COATINGS CONTAINING VERMICULITE

[75] Inventor: Richard G. Rion, Parma Heights, Ohio

[73] Assignee: Ferro Corporation, Cleveland, Ohio

[22] Filed: Mar. 11, 1974

[21] Appl. No.: 449,747

Related U.S. Application Data

[63] Continuation-in-part of Ser. No. 283,786, Aug. 25, 1972, abandoned.

[52] U.S. Cl. ............... 106/48; 106/45; 106/DIG. 3; 117/129
[51] Int. Cl.² ........................................... C03C 5/02
[58] Field of Search ............ 106/45, 15 FP, DIG. 3, 106/48; 117/129

[56] References Cited
UNITED STATES PATENTS

| | | | |
|---|---|---|---|
| 1,776,749 | 9/1930 | Buck | 106/DIG. 3 |
| 2,043,249 | 6/1936 | Jones | 106/DIG. 3 |

OTHER PUBLICATIONS

Myron; C., "The Development of an Insulating Enamel," American Ceramic Society Bulletin 35, (1956), pp. 6–10.

*Primary Examiner*—Helen M. McCarthy
*Assistant Examiner*—John F. Niebling
*Attorney, Agent, or Firm*—Milton L. Simmons

[57] ABSTRACT

Expanded or exfoliated vermiculite is utilized as a major, mill-added component, in association with a conventional porcelain enamel frit whereby an extraordinarily high degree of heat resistance is imparted to the final, fired porcelain enamel coating when applied to either mild or stainless ferrous substrates.

2 Claims, No Drawings

3,912,523

HEAT RESISTANT PORCELAIN ENAMEL COATINGS CONTAINING VERMICULITE

FIELD OF THE INVENTION

This is a continuation-in-part of Ser. No. 283,786, filed Aug. 25, 1972, now abandoned.

BACKGROUND OF THE INVENTION

The field of this invention may be described generally as residing in the ceramic arts, namely in the field of vitrified porcelain enamels for application to ferrous base metal substrates. These are in the nature of high temperature or heat resistant enamels utilized for protecting both mild steel and stainless steel substrates from oxidation and/or decomposition under protracted periods of exposure to exceedingly high temperatures.

In the past, the direction followed by research in its quest for effective, high temperature protective coatings for various ferrous substrates was directed toward developing highly expensive, and specialized complex frit formulations.

Such frit formulations were both difficult and costly to manufacture because of the extremely high temperatures required to smelt these compositions into homogeneous glasses.

As a consequence of the refractoriness of such specialized frit glasses, they were most difficult to successfully process by way of application to a metal substrate because of their inherent inability to react with the base metal sufficiently to provide good adherence.

That is, when a frit glass was compounded to be sufficiently refractory to resist high temperature exposure, following fusion to a substrate in the form of a porcelain enamel, this very desirable characteristic at the same time interfered with its ability to react with the substrate, in the controlled manner, so as to promote the essential adherence required.

Too, because of the fundamental refractory nature of prior heat resistant frits destined for application as a heat resistant porcelain enamel, considerable difficulty was encountered in achieving the desirable coefficient of thermal expansion relationship between the frit and base metal. As a consequence, coating thickness variations had to be maintained within very narrow tolerances.

That is, if the prior coatings were fused to a substrate in excess of the very narrow permissible thickness limits, spalling and flaking of the coating from the substrate resulted, particularly when the coating was utilized on moving parts which were subjected to either high frequency vibration and/or intermittent exposure to extremely high temperatures creating cyclical heat shock, causing spalling or flaking of the coating from the substrate to be protected.

Conversely, if the coating were applied too thinly in order to avoid spalling due to mechanical or heat shock conditions, it not infrequently tended to oxidize and burn off the substrate, thereby exposing it and effectively terminating its service life.

DESCRIPTION OF THE INVENTION

Briefly stated, this invention involves the discovery that conventional porcelain enamel frits, of the type that have been used heretofore to produce relatively glossy utilitarian-decorative vitreous coatings, such as are utilized on refrigerator liners, gas ranges, sanitary ware, etc., may be readily utilized are strictly utilitarian, high temperature, heat resistant coatings by combining with said frits, as a major constituent of the mill addition, a quantity of exfoliated vermiculite.

While expanded, or exfoliated, vermiculite has long been known as a very effective thermal insulating material, it is considered surprising that it will function as it does, as hereinafter disclosed.

Vermiculite has long been known as an effective heat insulation, but for some reason unknown to the inventor hereof, when added to an enamel milling in effective quantities, it does not interfere, upon firing of the enamel, with the proper fusion of the porecelain enamel to the substrate and the promotion of adherence.

Yet, following the fusion and curing of the porcelain enamel, containing a high level of vermiculite, on subsequent exposure thereof to high temperatures, the coating serves to impart a surprisingly high degree of heat resistance and a proportionately high degree of oxidation protection to the underlying ferrous metal substrate.

INVENTION SUMMARY

In essence then, the crux of this invention is the utilization of a substantial quantity of exfoliated vermiculite, as a mill added component, to an otherwise conventional vitreous enamel mill addition, to thereby convert said porcelain enamel from a conventional, utilitarian-decorative enamel coating, to a predominantly utilitarian highly heat-, oxidation-resisting coating for both mild, carbon and low carbon steels, as well as stainless steels.

OBJECTIVES

It is therefore one object of this invention to provide a highly heat resistant porcelain enamel composition, derived from an aqueous slip comprising a conventional frit, conventional electrolytes, floating agents and suspending agents, plus a substantial quantity of exfoliated vermiculite.

There is also another object of this invention which is to provide a new and novel method of applying a heat and oxidation resistant porcelain enamel coating to a metallic substrate.

It is yet another object of this invention to provide a substrate coated with a heat and oxidation resistant porcelain enamel coating, which coating is the product of a porcelain enamel slip consisting of an aqueous slip suspension of a conventional porcelain enamel frit, conventional electrolytes, floating and suspending agents, and a substantial percentage of exfoliated vermiculite.

DISCLOSURE

As stated above, the porcelain enamel frit of this invention is, in and of itself, not critical; the invention residing in the surprising ability of vermiculite to permit a porcelain enamel slip, of which it constitutes a major component, to be effectively fired out on a ferrous substrate to a matte to semi-matte, tightly adherent coating; then, on subsequent exposure of said coated substrate to elevated temperatures, the vermiculite imparting to said enamel coating all the properties of an outstanding heat resistant, anti-oxidation coating.

By "conventional" porcelain enamel frits, is meant any porcelain enamel frit adaptable to the fired over either mild, or cold-rolled, carbon steel, or any of the stainless varieties, in the form of either a decorative-utilitarian cover coat, such as is found on refrigerator liners, range tops and sanitary ware, or, as a conventional "blue" groundcoat containing minor amounts of the adherence promoting oxides of cobalt, manganese and nickel, as an intermediate coating.

Exemplary of the innumerable porcelain enamel frits which readily lend themselves to the practice of this invention, in Table I below is set forth the preferred batch composition of a typical, conventional ground coat frit:

Table I

| | Parts by Weight |
|---|---|
| Borax | 771 |
| Powdered Quartz | 496 |
| Soda Ash | 175 |
| Soda Nitrate | 139 |
| Fluorspar | 289 |
| Zinc Oxide | 82 |
| Spodumene | 266 |
| Lithium Carbonate | 109 |
| Barium Carbonate | 119 |
| Potassium Nitrate | 61 |
| Sodium Tri Poly Phosphate | 27 |
| Potter's Whiting | 132 |
| Milled Zircon | 85 |
| Cobalt Oxide | 19 |
| Copper Oxide | 15 |
| Manganese Oxide | 24 |
| Nickel Oxide | 28 |
| Total: | 2,837 |

When properly mixed, and smelted to a porcelain enamel frit, using conventional smelting and quenching procedures, the foregoing batch composition will provide a fritted glass having the following composition:

Table II

| | Parts by Weight |
|---|---|
| $Na_2O$ | 16.30 |
| $K_2O$ | 1.16 |
| $Li_2O$ | 2.48 |
| $CaO$ | 11.30 |
| $BaO$ | 3.79 |
| $ZnO$ | 3.38 |
| $B_2O_3$ | 21.00 |
| $Al_2O_3$ | 2.72 |
| $F$ | 5.57 |
| $ZrO_2$ | 2.35 |
| $SiO_2$ | 29.29 |
| $P_2O_5$ | 0.66 |
| Total: | 100.00 |

In Table III below, is set forth the chemical composition and physical characteristics of the vermiculite utilized in the practice of this invention, with the understanding that the word "vermiculite" as used throughout this disclosure shall refer to exfoliated, or expanded, vermiculite.

The foregoing frit, utilizing vermiculite of the composition and physical properties of Table III, was then compounded into the various coatings as hereinafter set forth in Tables IV – VI, applied, tested and evaluated as described:

Table III

Chemical Composition (Wt.%) Vermiculite

| | |
|---|---|
| $SiO_2$ | 38.64% |
| $MgO$ | 22.68 |
| $Al_2O_3$ | 14.94 |
| $Fe_2O_3$ | 9.29 |
| $K_2O$ | 7.84 |
| $CaO$ | 1.23 |

Table III-Continued

| | |
|---|---|
| $Cr_2O_3$ | 0.29 |
| $Mn_3O_4$ | 0.11 |
| $P_2O_5$ | Trace |
| S | Trace |
| Cl | 0.28 |
| $H_2O$ | 5.29 |
| Exfoliation temperature | 1800°F – 1900°F |
| Fusion Point | 2200°F – 2400°F |
| Specific Heat | 0.24 |
| Bulk Density | 1.5 to 2.5 lbs/ft³ |

Table IV

Mill Addition for Coating A

| Mill Component | Parts by Weight (qm) |
|---|---|
| Frit | 100 |
| Green L. Clay | 3 |
| Borax | 1/8 |
| Sodium Tetra Pyro Phosphate (Pyro) | 1/4 |
| Citric Acid | 1.0 |
| Alumina | 80 |
| Vermiculite | 100 |
| Water | 100 |

Table V

Mill Addition for Coating B

| Mill Component | Parts by Weight (qm) |
|---|---|
| Frit | 100 |
| Green L. Clay | 5.6 |
| Borax | 1/8 |
| Sodium Tetra Pyro Phosphate (Pyro) | 1/4 |
| Citric Acid | 1.0 |
| Vermiculite | 200 |
| Water | 200 |

Coating B works best on 409, 430 and other Ferritic type stainless steels. Vermiculite utilized more for its insulating properties, than for oxidation protection, is demonstrated by coating C in Table VI below.

Table VI

Mill Addition for Coating C

| Mill Component | Parts by Weight (qm) |
|---|---|
| Frit | 100 |
| Green L. Clay | 3.00 |
| Citric Acid | 1.0 |
| Sodium Tetra Pyro Phosphate | 1/2 |
| Vermiculite* | 600 |
| Water | 600 |

*Vermiculite pre-ground to 100 mesh size.

The preparation and application of the foregoing coatings require the following steps.

First, No. 3 grade vermiculite (–4 mesh) is pre-ground dry in a porcelain ball mill to – 100 mesh size. Then the frit, clay, electrolytes and water are weighed out in proper proportions and ground wet in a one gallon porcelain jar mill until a fineness of 0.2 to 1.0 gram of dry material remains on a 200 mesh screen after washing through a 50cc sample of wet enamel milling. The milling is then screened through a 60 mesh screen.

The metal substrate is prepared for coating with the above enamel in one of two ways as of follows: (1) Low carbon steels, enameling iron and cold rolled steels are prepared by the normal alkaline cleaning, sulfuric acid etch, nickel dip process generally used throughout the enameling industry. Metal etch for best adherence should be in the range of 0.75–1.25 grams per square foot of surface and nickel deposition from 0.06 to 0.08 grams per square foot. (2) When using stainless steels 409, 430 or other Ferritic and non-ferritic stainless steels, the metal is first annealed at 1600°–1700° F for 5–10 minutes for 20 to 18 gauge stainless. Next the surface is sandblasted at pressures of 40–50 lbs per square inch using silica sand. Test samples are then blown free of any sand or dust before enameling.

The enamel is adjusted to a specific gravity of 1.70 and sprayed on both sides of the metal substrate at a wet application of 12–18 grams per sq. ft. Samples are then dried to 180°–200° F. The coated metal is then fired in an electric furnace for 5–10 minutes for 20 and 18 gauge stainless respectively at the appropriate temperature.

Table VII

An example of a firing range (with the optimum firing temperature indicated) on low carbon 20 gauge steel using coating A from Table IV is set forth below:

Table VII

Firing Range of Coating A on Low Carbon Steel

| Firing Temperature | Firing Time | Adherence | Visually Graded Surface |
| --- | --- | --- | --- |
| 1480°F | 4 minutes | Poor-Fair | Matte |
| 1520°F | 4 minutes | Fair-Good | Matte |
| 1560°F | 4 minutes | Good-V.Good | Matte |
| 1600°F | 4 minutes | Excellent | Matte |
| 1640°F | 4 minutes | V.Good | Matte |

Note: Optimum fire is 1560°F, with permissible variation to 1520° to 1640°F.

Table VIII

This table illustrates an example of a firing range comparison of the coatings shown in Tables V and VI on 20 gauge 430 stainless steel.

Firing Range of Coatings B and C on 430 Stainless Steel

| Firing Temperature | Firing Time | Adherence and Surface | |
| --- | --- | --- | --- |
| | | Coating B | Coating C |
| 1650°F | 7 minutes | Fair Matte | |
| 1700°F | 7 minutes | Fair-Good Matte | |
| 1750°F | 7 minutes | Very Good Matte | |
| 1800°F | 7 minutes | Very Good Matte | Underfired Flaked Off |
| 1850°F | 7 minutes | V.Good Sl. Semi Matte | Poor-None Matte |
| 1900°F | 7 minutes | V.Good Semi Matte | Poor Matte |
| 1950°F | 7 minutes | V.Good Semi Matte | Fair-Good Matte |
| 2000°F | 7 minutes | Good Matte | Fair-Good Matte |
| 2100°F | 7 minutes | — | Fair-Good Sl. Semi Matte |

Preparation and Application of Coatings

Coatings were prepared from mixtures of frit, clays, electrolytes, refractory materials (alumina and chrome oxide) and −100 mesh vermiculite. The various materials were weighed out in the proper proportions and ground wet in a one gallon ball mill. When ground properly the solid ingredients of the slip (milled enamel) are of sucn fineness that 0.00 to 0.20 grams of material is retained on a No. 200 sieve and less than 4.0 grams on a No. 325 sieve from a 50 cc sample when tested by the method generally used in the porcelain enamel industry. When proper fineness is reached the fluid enamel coating material (slip) is screened through a No. 60 mesh sieve and adjusted to a specific gravity of 1.65–1.75 for spraying.

Specimens of the desired size of 20 gauge enameling iron, zero carbon steel or cold rolled steel were prepared by the normal alkaline clean-sulphuric acid etch-nickel flash process normally used for metal preparation in the enamel industry. Specimens of 20 gauge 430 stainless steel or other ferritic stainless steels are prepared for enameling by first heating the metal to 1400°–1600°F for 5 to 10 minutes, then allowing to cool and finally sand blasting at 40–50 lbs per sq. inch maximum pressure to obtain a smooth "velvety" appearing etch.

The enamel slip is then sprayed onto each side of the various iron samples using a pressure of 40–45 lbs per sq. inch and an application weight of 27 grams wet per sq. ft. of surface area. Specimens are then dried at 175°–220°F and fired in an electrically heated furnace at the optimum temperature and times shown for the particular enamel coating in tables VII and VIII.

The coating is applied to the ferritic stainless steel in the same manner as above, except the application weight is held to 14 to 18 grams wet per square foot of surface.

Testing of Fired Coatings

The first test applied to all coatings is that of determining the firing temperature for normal maturity. Specimens of each individual coating are fired over a range of temperatures and examined visually for maturity (or degree of vitrification). Then the best adherence temperature within the mature range of the coating is chosen as that coating's optimum firing temperature.

Adherence of the coating was measured visually by comparing the relative amount of glass remaining in the impact area resulting from the regular "drop-weight" adherence test common to the porcelain enamel industry.

Heat Testing of Coated Samples

Previously fired enameled test samples were weighed on an appropriate balance to four decimal places before hanging in an electric box type furnace at the heat test temperatures desired. Samples were cooled in air after each test time and re-weighed as above. The difference in weight between that of the original (untested) and the particular test cycle time was recorded as the amount of oxidation for that test cycle. Results are recorded in milligrams per square centimeter of surface exposed. Succeeding heat test cycles show results which are cumulative (indicating the degree of progressive oxidation with time of heat exposure).

Table IX

This table shows heat test results on coated samples of 430 stainless steel tested at 1800°F.

Table IX

| Sample Number | Composition Parts by Weight | Cumulative Weight Change (Mg/sq cm) at Times Shown | | | | | |
|---|---|---|---|---|---|---|---|
| | | 17 Hrs | 21 Hrs | 38 Hrs | 42.5 Hrs | 59 Hrs | 123 Hrs |
| D | 100 Frit<br>80 Al$_2$O$_3$<br>100 Vermiculite | 0.1068 | 0.1522 | 0.526 | 0.595 | 0.764 | 0.920 |
| E | 22 Frit<br>78 Vermiculite | 0.232 | 0.324 | 0.745 | 0.714 | 0.833 | 0.890 |
| F | 100 Frit<br>80 Alumina | 7.91 | 8.85 | 10.29 | 10.51 | 13.15 | 15.95 |
| G | 100 Frit | 33.10 | 36.20 | 48.45 | 50.2 | 51.45 | 57.3 |
| H | 33 Frit<br>67 Vermiculite | 0.122 | 0.1495 | 0.251 | 0.293 | 0.311 | 0.343 |
| I | 15 Frit<br>85 Vermiculite | 0.329 | 0.470 | 1.065 | 1.22 | 2.83 | 3.86 |
| J | Blank (Uncoated 430 Stainless)* | 1.00 | 17.05 | 21.95 | 22.55 | 22.80 | — |

The above compositions all based on 100 parts frit are shown below:

| | D | E | F | G | H | I |
|---|---|---|---|---|---|---|
| Frit | 100 | 100 | 100 | 100 | 100 | 100 |
| Alumina | 80 | — | 80 | — | — | — |
| Vermiculite | 100 | 350 | — | — | 200 | 650 |

*Note: Weight changes on the blank sample are inconsistent because as the metal oxidizes a scale builds up to a certain thickness and periodically falls off.

In the foregoing examples, the 1:1 frit:vermiculite ratio of sample D above is, from the standpoint of the preferred embodiment of this invention, used as a basis of comparison to demonstrate that a ratio greater than 1:1 is considered to be the lower, practical and advantageous ratio for the pruposes of this invention. Actually, as set forth hereinafter, the preferred lower vermiculite:frit ratio is a minimum of 1.2:1, or about 60 weight percent vermiculite, with respect to frit in the final coating.

It is considered surprising that, at enamel loadings of vermiculite at ratios of 1.2:1 or higher, sufficient coating strength, and adherence to the substrate would be obtained to provide a durable, practical coating.

Prior investigators found that, at increasing levels of vermiculite in the finished coating, approaching that of the frit, or approaching a 1:1 ratio, the trend appeared to be that the impact resistance of the resultant coating became increasingly inferior, and the enamel coatings were progressively more powdery and soft with a tendency to flake off under impact.

Without theorizing as to why the instant invention reverses the trend as the 1:1 ratio is exceeded, and functions as it does, suffice it to say that at the higher loadings of vermiculite, where at it would be expected that impact resistance and adherence would be adversely affected as discussed above, utilizing the instant invention, good adherence and surface durability are achieved up to a vermiculite:frit ratio of 6.5:1.

Another example showing the use of vermiculite in a coating for iron is shown in Table X below.

TABLE X

This table shows heat test results after testing coated and uncoated samples of enameling iron at 1200°F.

| Sample Composition | Cumulative Weight Gain from oxidation at 1200°F for times shown below | | | |
|---|---|---|---|---|
| | 16 Hrs | 31 Hrs | 48 Hrs | 111 Hrs |
| Frit 100 | 0.800 | 2.140 | 2.790 | 3.65 |
| Vermiculite 200 | 0.325 | 0.427 | 0.542 | 0.965 |
| Blank Enamel Iron | 5.59 | 10.25 | 12.50 | 19.80 |

As used throughout this specification the various terms used in the enameling art such as "electrolytes", "floating agents", and "suspending agents", carry their conventional connotations, and are essentially as documented in U.S. Pat. NO. 3,625,719, issued Dec. 7, 1971 to Ellinger.

Too, as is further well documented in the porcelain enameling art, particularly in "Porcelain Enamels" by Andrews, the terms "porcelain enamel", and "frit" (porcelain enamel) as used herethroughout refer to any of countless vitreous compositions which, when utilized with conventional mill additions, but without the addition of vermiculite, provide a compatible, tightly adherent porcelain enamel coating over steel or stainless steel substrates.

The essential physical and chemical characteristics of the frits, and resulting porcelain enamels, useful to the practice of this invention are:
1. A coefficient of thermal expansion sufficiently close to that of the ferrous substrate so as to put the final enamel coating, at normal temperatures, preferably in just slight compression.
2. Sufficient reactivity with the ferrous substrate at enameling temperatures to provide good adherence at the enamel-substrate interface, but not so reactive as to cause physical defects, such as blisters or pits, in the final, fired enamel coating.
3. At conventional enameling times and temperatures, the ability to mature to a relatively glossy, enamel surface.

As will be readily apparent from the foregoing specification, the preferred level of vermiculite in the final, fired coating will be from about 60 to about 70 percent by weight, though noticeable, advantageous results may be achieved within a 40 to 90 percent vermiculite range (by weight of the final, fired enamel coating).

In terms of vermiculite expressed as a component of the mill addition, the ratio of vermiculite:frit may vary from about 6.50:1 to about 1:1.

While there would be some measurable advantage to a vermiculite:frit ratio on the order of 0.5:1, the advantages would likely be marginal. A loading of vermiculite much in excess of a 6.5:1 ratio would tend to produce a somewhat fragile coating, one which would likely lack the required adherence for proper performance under high stress conditions.

Generally, aside from the frit-vermiculite components of the enamel mill addition under consideration, it may contain from 0 to about 6 parts by weight enameling clay, from 0 to about 2 parts by weight electrolyte, from 0 to about ½ part by weight floating agent, and from about 100 to 600 parts by weight water.

The reason the acceptable lower limit of the ranges of clay, electrolyte and floating agent may be zero is that, by its physical nature, vermiculite tends to impart, without the aid of any other conventional mill components, a high degree of "set" to the milled combination.

Thus, while it might not be the most practical coating composition, a straight vermiculite-frit-water suspension could be applied to a substrate without the conventional mill components (though they are preferred), and provide acceptable rheological properties to the final, milled slip.

As is well known in the enameling art, "pyro" (tetrasodium pyrophosphate) has the effect of reducing "set", and is utilized to modify the high degree of "set" imparted by the high level of vermiculite. Note, heavily loaded mill addition C contains a full ½ part by weight of pyro.

However, because of the alkali introduced by "pyro", anything over ½ part in the mill addition tends to basically alter the final glass composition.

For this reason, citric acid is utilized to supplement pyro in order to reduct "set".

I claim:

1. A heat resistant porcelain enamel composition, adaptable to be fused to a metallic substrate at from about 1520°F. to 1640°F., consisting essentially of an aqueous slip suspension of:
    a. a greater than 100 but less than 650 parts by weight exfoliated, powdered vermiculite,
    b. 100 parts by weight of an alkali silicate based porcelain enamel frit,
    c. from 0 to 6 parts by weight of enameling clay,
    d. from 0 to 2 parts by weight electrolyte,
    e. from 0 to ½ parts by weight floating agent,
    f. from 100 to 600 parts by weight water, the foregoing components of said slip present as a ball milled interspersion therethroughout.

2. The heat resistant porcelain enamel slip of claim 1 wherein said vermiculite, prior to incorporation into said slip, had been milled to a fineness less than 100 mesh, the final slip is milled to a fineness of 0.2 to 1.0 grams solids retained on a 200 mesh screen from a washed 50 cc sample of said slip, and the ratio vermiculite:frit varies from about 1.2:1 to about 6.5:1.

* * * * *